(12) United States Patent
Wallace et al.

(10) Patent No.: US 11,346,348 B2
(45) Date of Patent: May 31, 2022

(54) LIQUEFIED GAS UNLOADING AND DEEP EVACUATION SYSTEM

(71) Applicant: Corken, Inc., Oklahoma City, OK (US)

(72) Inventors: Blake Wallace, Oklahoma City, OK (US); Jay Taylor, Oklahoma City, OK (US)

(73) Assignee: ADVANCED FLOW SOLUTIONS, INC., Oklahoma City, OK (US)

( * ) Notice: Subject to any disclaimer, the term of this patent is extended or adjusted under 35 U.S.C. 154(b) by 56 days.

(21) Appl. No.: 16/560,423

(22) Filed: Sep. 4, 2019

(65) Prior Publication Data
US 2021/0062814 A1   Mar. 4, 2021

(51) Int. Cl.
F04D 15/00 (2006.01)
B61D 3/16 (2006.01)
(Continued)

(52) U.S. Cl.
CPC .......... F04D 15/0066 (2013.01); B61D 3/16 (2013.01); F04D 13/12 (2013.01); F04D 13/16 (2013.01);
(Continued)

(58) Field of Classification Search
None
See application file for complete search history.

(56) References Cited

U.S. PATENT DOCUMENTS

| 6,644,039 B2 * | 11/2003 | Hughes | F17C 5/02 141/82 |
| 2004/0187957 A1 * | 9/2004 | Scheeter, Jr. | F17C 7/02 141/86 |

(Continued)

FOREIGN PATENT DOCUMENTS

| EP | 2392825 A2 * | 12/2011 | ............ F04B 49/065 |
| JP | 2018-017145 A | 2/2018 | |
| KR | 10-2010-0108932 A | 10/2010 | |
| KR | 10-2017-0112445 A | 10/2017 | |
| KR | 10-2019-0030329 A | 3/2019 | |

OTHER PUBLICATIONS

Baelz, "2-Way vs 3-Way Valves: Which Type is Right for You?", (Published in 2018; NPL obtained on Jun. 4, 2021 from "https://info.baelzna.com/blog/2-way-vs-3-way-valves") (Year: 2018).*
(Continued)

*Primary Examiner* — Peter J Bertheaud
*Assistant Examiner* — Geoffrey S Lee
(74) *Attorney, Agent, or Firm* — Tucker Ellis LLP; Heather M. Barnes; Michael G. Craig

(57) ABSTRACT

A liquefied gas unloading and deep evacuation system may more quickly, more efficiently and more completely unload liquefied gases from transport tanks, such as rail cars, into stationary storage tanks or into truck tanks. The system may utilize a two stage compressor, an electric motor, a variable frequency drive, a four way valve, a three way valve, a two way valve, a programmable logic controller based control system and pressure and temperature transmitters. The valving enables deep evacuation of the transport or supply tank to more completely empty the transport tank. The programmable logic controller and variable speed drive may be used to variably control the speed of the two stage compressor so that the system may be running as fast as possible during changes in ambient temperature and/or different stages of offloading the liquefied gases without exceeding the compressor's horsepower limit.

12 Claims, 19 Drawing Sheets

(51) Int. Cl.
 *F04D 13/16* (2006.01)
 *F04D 13/12* (2006.01)
 *B65G 63/02* (2006.01)

(52) U.S. Cl.
 CPC ..... *F04D 15/0005* (2013.01); *F04D 15/0072* (2013.01); *B65G 63/02* (2013.01)

(56) References Cited

U.S. PATENT DOCUMENTS

| | | |
|---|---|---|
| 2009/0100844 A1 | 4/2009 | Rummelhoff |
| 2011/0103976 A1* | 5/2011 | Fejzuli ............... F04B 25/00 417/53 |

OTHER PUBLICATIONS

International Search Report and Written Opinion from corresponding International Application No. PCT/US2020/046768, dated Nov. 17, 2020.

* cited by examiner

LIQUEFIED GAS UNLOADING AND DEEP EVACUATION SYSTEM

BACKGROUND

Single stage compressors have been the traditional mechanism for liquefied gas transfer and vapor recovery applications for decades. Single stage compressors provide the highest capacity and efficiency during the liquid transfer process, as well as during the first portion of the vapor recovery process. These traditional means of liquid transfer and vapor recovery, however, leave behind valuable product in the supply tanks. The single stage compressor operation must stop due to low volumetric efficiency or high discharge temperatures before all of the product can be transferred. Customers using these compressors typically pay for the full contents of the supply tanks, usually a rail car or tank trucks, whether or not that customer is able to recover all of the product. Additionally, speed is an important factor in the offloading of liquefied gasses. Increased offloading speeds can reduce the expenses of rail demurrage charges and labor. Traditional single stage compressors may operate at a fixed operating speed. A fixed operating speed does not allow the system to maintain a maximum fluid transfer rate. Pressures and temperatures change throughout the offloading process and throughout the different seasons of the year. A variable compressor operating speed that adjusts based on the changing pressures and temperatures of the system, and thus is able to maintain a maximum fluid transfer rate throughout offloading, would be beneficial.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation a liquefied gas unloading and deep evacuation system may comprise a two stage compressor. The two stage compressor may comprise a single stage mode and a two stage mode. The two stage compressor may also comprise a first cylinder and a second cylinder. The two stage compressor may be selectably changeable between the single stage mode and the two stage mode at a predetermined pressure.

The liquefied gas unloading and deep evacuation system may also comprise a liquid trap fluidly coupled to the two stage compressor.

The liquefied gas unloading and deep evacuation system may also comprise a three way valve. The three way valve may fluidly couple the two stage compressor with a four way valve. The three way valve may be selectably changed between a first passageway and a second passageway. The first passageway may fluidly couple the first cylinder with the four way valve. The second passageway may fluidly couple the first cylinder with the second cylinder of the two stage compressor.

The four way valve may comprise a first position and a second position. The first position may comprise a first passageway. The first passageway may fluidly couple the three way valve, the second cylinder, and a supply tank. The second passageway may fluidly couple a storage tank with the liquid trap during the liquefied gas unloading.

The second position may comprise a third passageway, which may fluidly couple the supply tank with the liquid trap. The second position may also comprise a fourth passageway, which may fluidly couple the three way valve, the second cylinder of the two stage compressor, and the storage tank during the single stage vapor recovery_mode.

The second position may also comprise the third passageway, which may be fluidly coupled between the supply tank and the liquid trap. The second position may also comprise the fourth passageway, which may fluidly couple the second cylinder of the two stage compressor, and the storage tank during the during the two stage mode.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
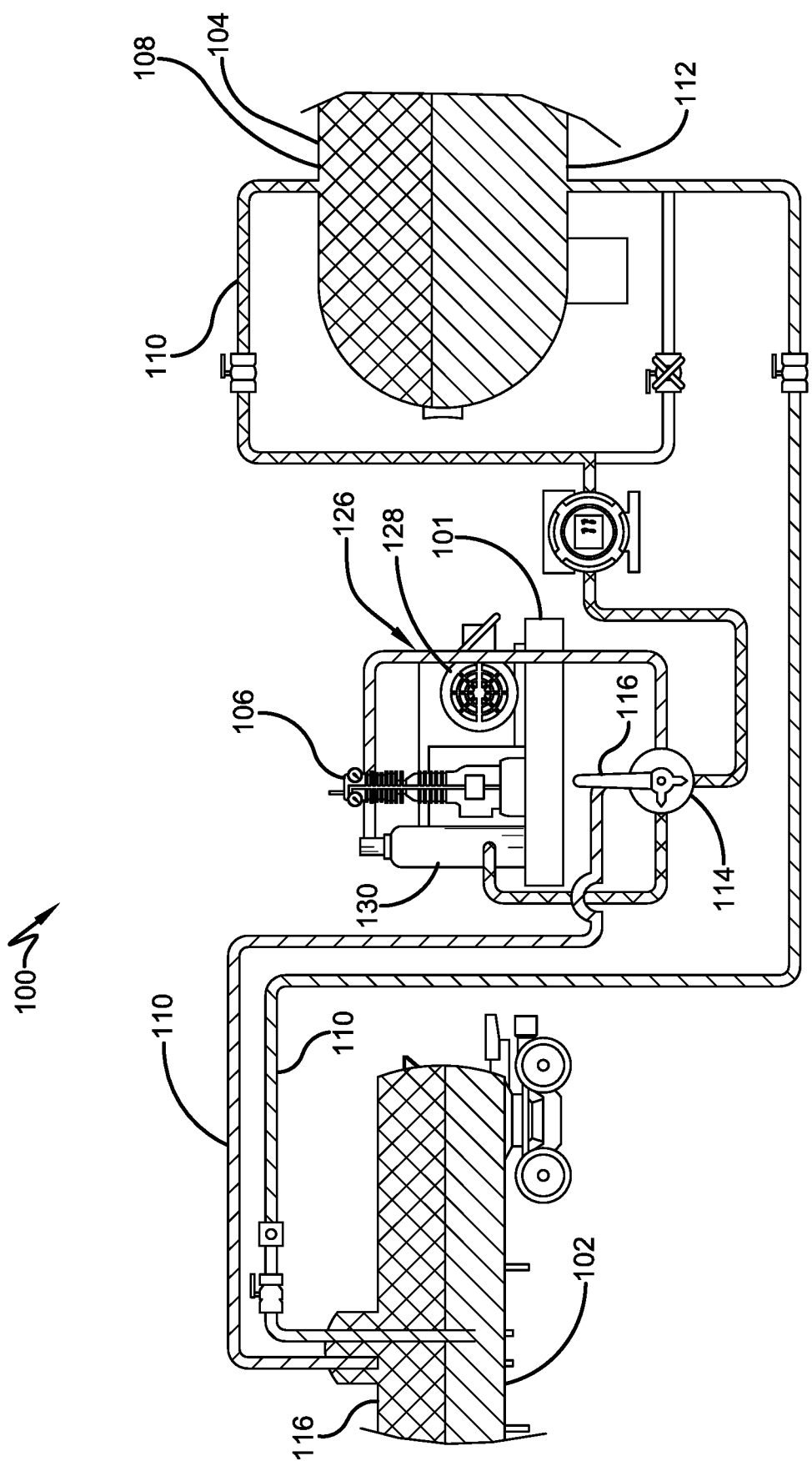
FIG. 1 is a diagram of an example implementation showing a liquefied gas unloading and deep evacuation system during liquid transfer operation.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

An example liquefied gas unloading and deep evacuation system 100 is shown and described. Liquid or liquefied gas may be any liquid gases, including without limitation, propane, propylene, ammonia, refrigerants, butane, or other liquefied gas. The implementation of a two stage compressor, capable of both single stage and two stage operation, into the offloading process of liquefied gases such as propane, propylene, ammonia, and refrigerants is advantageous. Switching the two stage compressor from single stage operation to two stage operation through the quick and simple adjustment of control valves will allow the customer to benefit from the deep tank evacuation capabilities of a two stage compressor. Deep tank evacuation capabilities means the customer will be able to recover additional liquid or product from the rail or truck supply tank. A two stage compressor equipped with a variable frequency drive (VFD) and a programmable logic controller (PLC) based control system has further advantages. The PLC is capable of maximizing the operational speed of the compressor based on the temperature and pressures of the system. By maximizing the speed of the compressor, and therefore maximizing the fluid transfer rate, within the limits of the power rating of the compressor and the limits of the excess flow valves fitted to the supply tanks, the offloading of the fluid is faster and more efficient.

Figure 2:
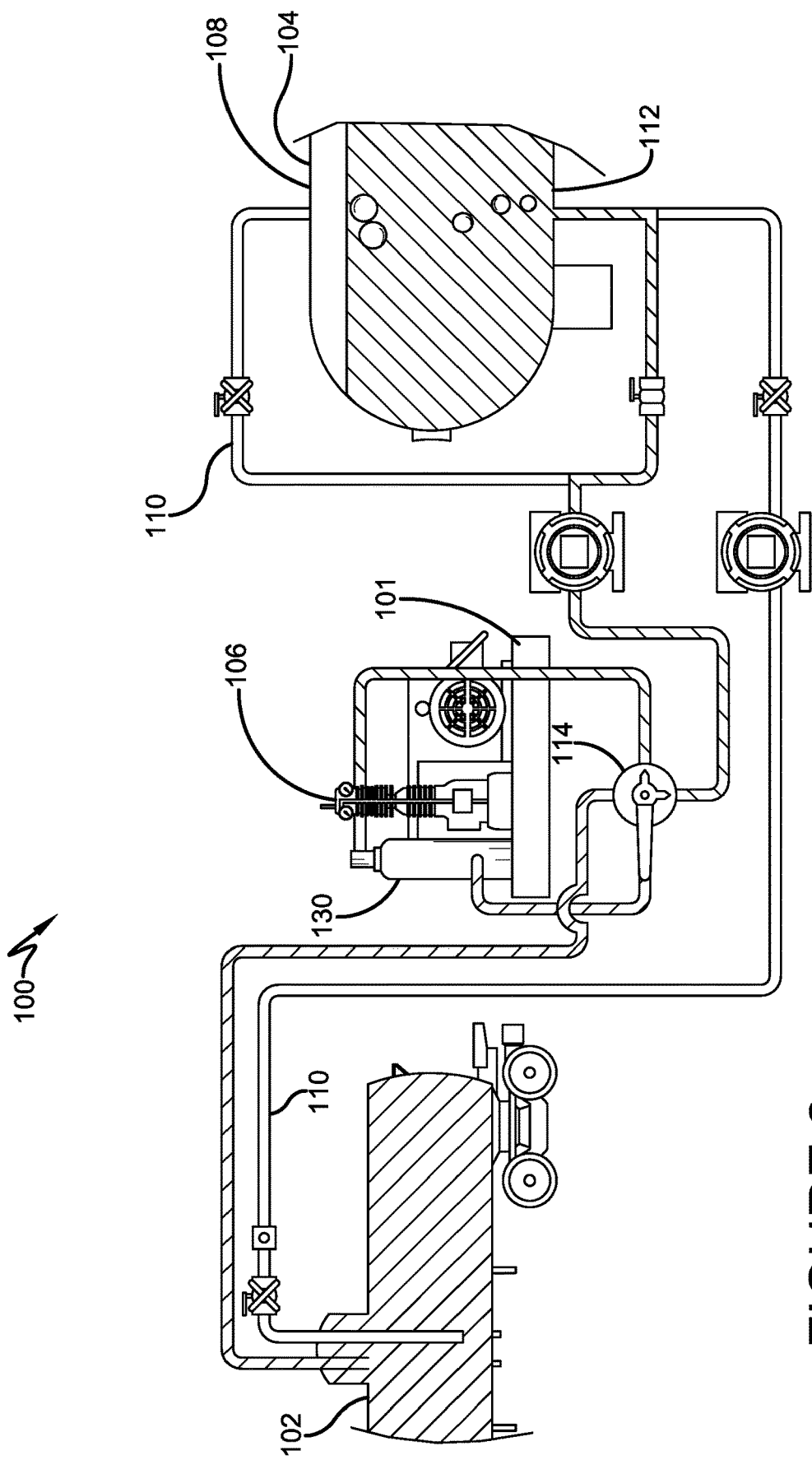
FIG. 2 is a diagram of an example implementation showing a liquefied gas unloading and deep evacuation system during vapor recovery operation.
Figure 3A:
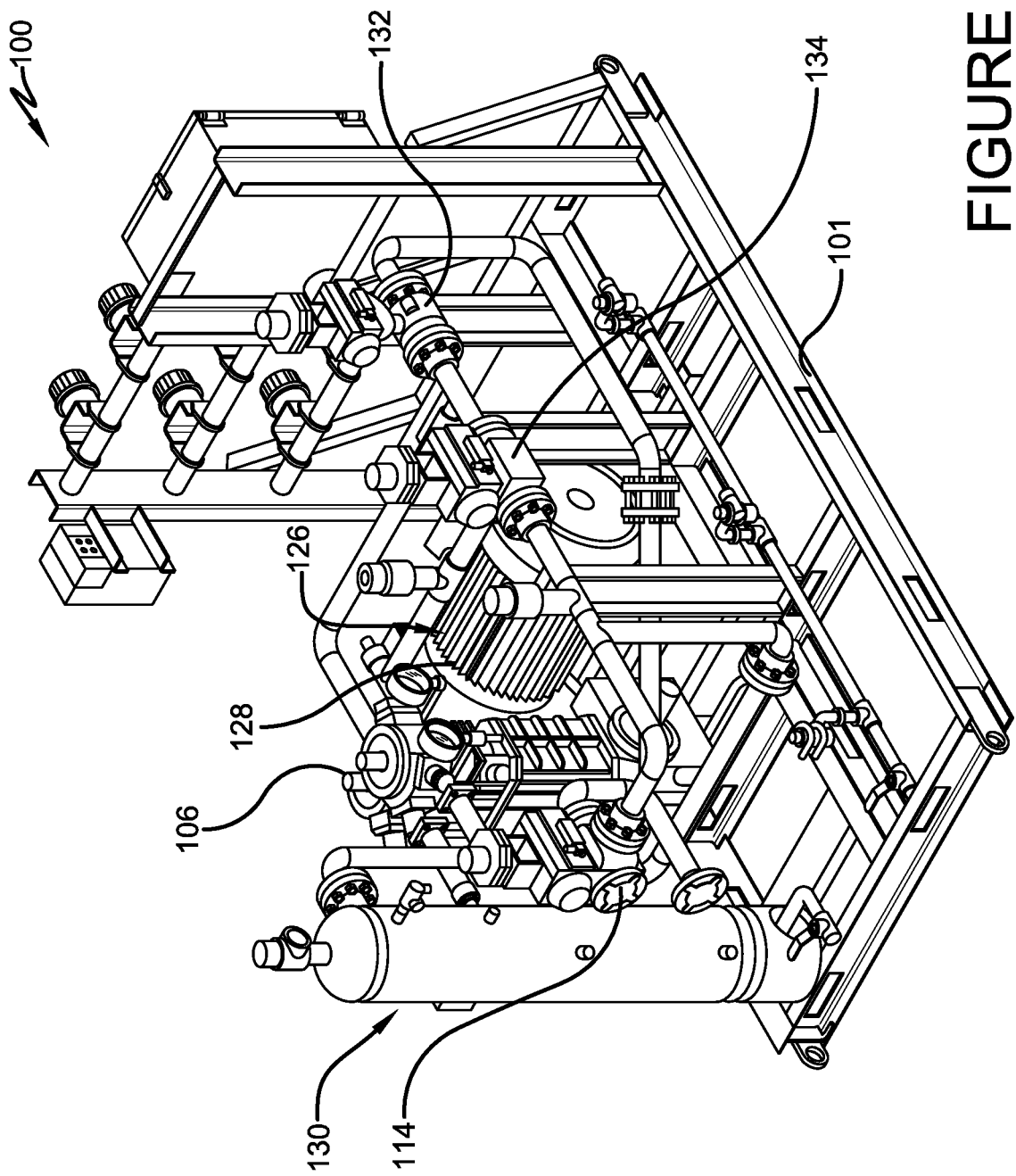
FIG. 3A is a perspective view of an example implementation showing a liquefied gas unloading and deep evacuation system.
Figure 3B:
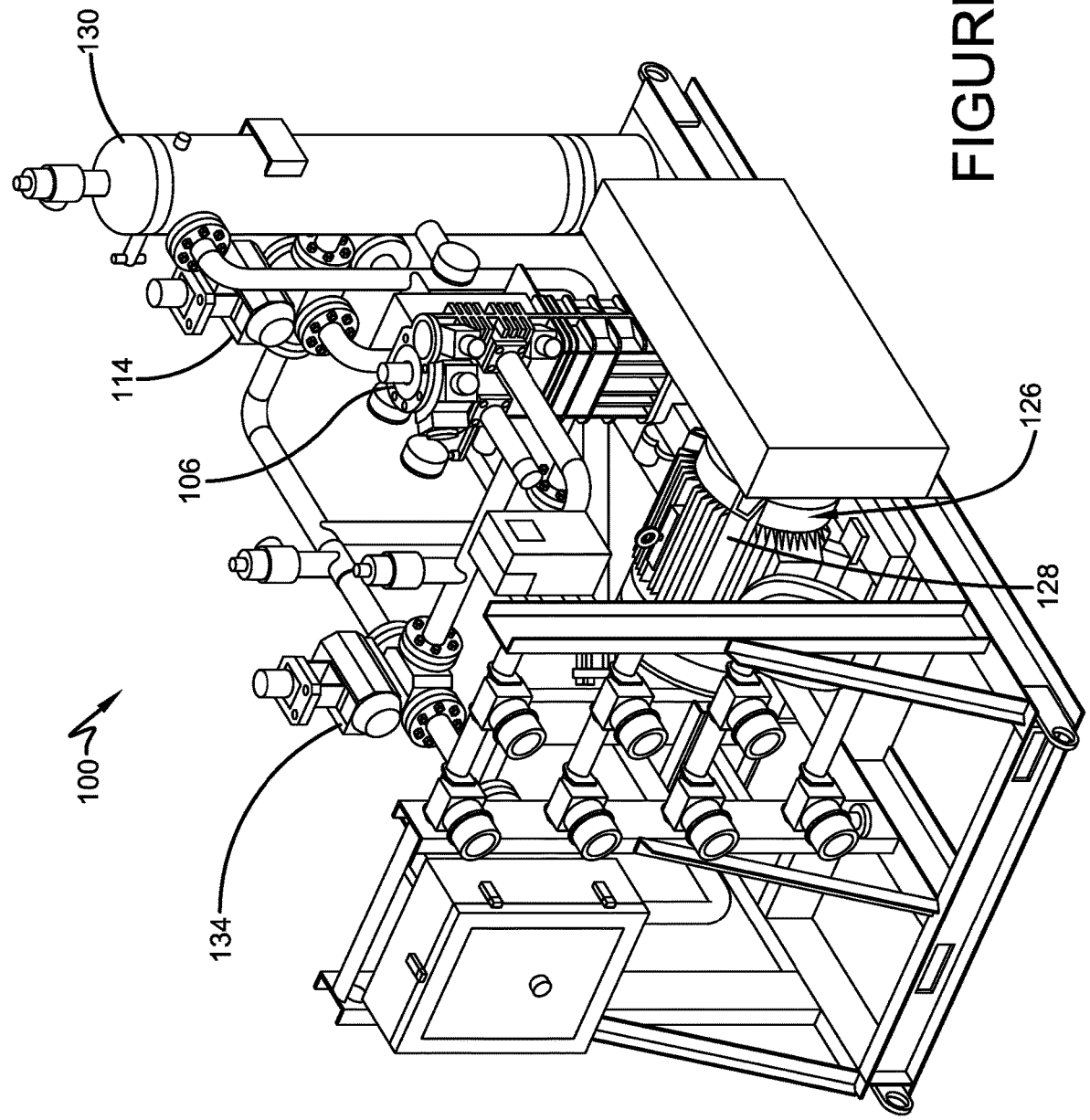
FIG. 3B is another perspective view of an example implementation showing a liquefied gas unloading and deep evacuation system.

Liquid transfer and vapor recovery are shown in FIGS. 1 and 2. With reference to FIG. 1, a diagram of an example implementation of a liquefied gas unloading and deep evacuation system 100 during liquid transfer operation is shown.

Before the liquid transfer process begins, pressure is equalized between both a supply tank 102 and a storage tank 104. The supply tank 102 may be a rail car, truck transport tank, other transport tank, or another stationary tank. When a two stage compressor 106 is started it pulls vapor from a top 108 of the storage tank 104 through transfer piping 110. The two stage compressor 106 may be a two stage reciprocating gas compressor. The two stage compressor 106 compresses vapor and increases the vapor pressure as it is pushed into a top 116 of the supply tank 102. As differential pressure between the supply tank 102 and the storage tank 104 increases, liquefied gas begins to flow from the supply tank 102 to the storage tank 104 through transfer piping 110. A four way valve 114 having a first position 140 enables the liquid transfer process to occur. The liquid transfer process is now complete, but liquid heel remains.

With reference to FIG. 2, the compressor 106 is turned off to begin the vapor recovery process. The four way valve 114 may be reversed and disposed in a second position 142 and other valves are opened or closed to facilitate the vapor recovery. The two stage compressor 106 is started and begins to draw the vapor from the supply tank 102. The liquid heel, which may refer to the remaining liquid in the supply tank 102 boils off during the recovery process. The liquid heel may account for about 0.5% of the total supply tank 102 volume. The two stage compressor 106 compresses the vapor and increases the vapor pressure as it is pushed into the bottom 112 of the storage tank 104. The vapor recovery process is complete when a desired evacuation pressure is reached.

FIGS. 3A-11 illustrate the liquefied gas unloading and deep evacuation system 100 in further detail. In one example implementation, the liquefied gas unloading and deep evacuation system 100 components may be disposed on a skid 101. The liquefied gas unloading and deep evacuation system 100 may be powered by power means 126, such as electric motor 128, combustion engine, hydraulic motor, or other means. The two stage compressor 106 may comprise a first cylinder 120 and a second cylinder 122. In one implementation, the first cylinder 120 may be larger than the second cylinder 122. In another implementation, the first cylinder 120 may be about six inches in diameter, and the second cylinder 122 may be about 3.25 inches in diameter. Piping outside of a compressor housing 124 may enable the two stage compressor 106 to operate in a single stage mode and a two stage mode. The two stage compressor 106 may be selectably changeable between the single stage mode and the two stage mode at a predetermined pressure.

A liquid trap 130 may be fluidly coupled with the two stage compressor 106 and the four way valve 114. The liquid trap 130 may be fluidly coupled to a suction side of the two stage compressor 106. The liquid trap 130 may trap liquid before it enters the two stage compressor 106. Even though the two stage compressor 106 may be fluidly coupled to vapor lines, small amounts of liquid may be present due to temperature changes and, thus, causing condensation to be in the vapor lines. At other times, incorrectly positioned valves may allow liquid to enter the vapor lines.

A two way valve 132 may selectably and fluidly couple the liquid trap 130 with the two stage compressor 106. The two way valve may fluidly couple the liquid trap 130 with the second cylinder 122 of the two stage compressor 106. In another implementation, the two way valve 132 may be open during the single stage mode of the two stage compressor 106, as shown in FIGS. 4-8. During the single stage mode and the two way valve 132 in an open position, the first cylinder 120 and the second cylinder 122 are piped in parallel such that vapor leaving the liquid trap 130 is split into two lines, where one line enters the first cylinder 120 and the second line passes through the open two way valve 132 and enters the two stage compressor 106 through the second cylinder 122. Operating the two stage compressor 106 with the two way valve 132 in the open position enables for faster speeds and higher efficiency for liquid transfer from the supply tank 102 to the storage tank 104. The two way valve may remain in the open position during the liquid transfer stage and the initial vapor recovery stage. In a nonlimiting implementation, the two way valve 132 may remain open until the predetermined pressure reaches about 50 psi. In another implementation, the two way valve 132 may remain open until the predetermined pressure reaches about 40 psi. In yet another implementation, the two way valve 132 may remain open until the predetermined pressure reaches about 30 psi, 20 psi or 0 psi.

Figure 9:
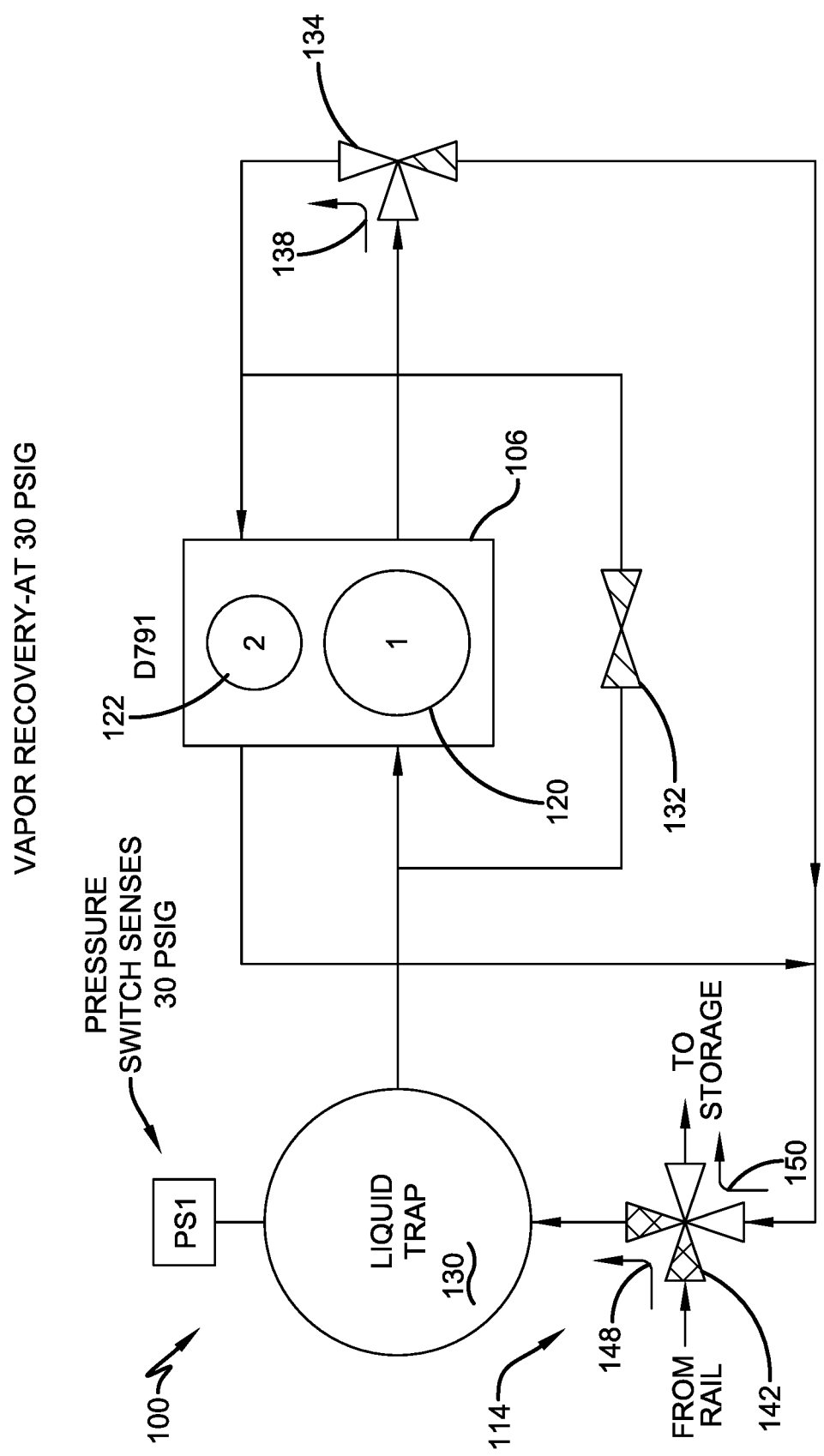
FIG. 9 is a schematic drawing illustrating an example implementation of a liquefied gas unloading and deep evacuation system at a point when the system reaches a predetermined pressure during vapor recovery and may be stopped and changed to two stage mode where the cylinders are piped in series.
Figure 10:
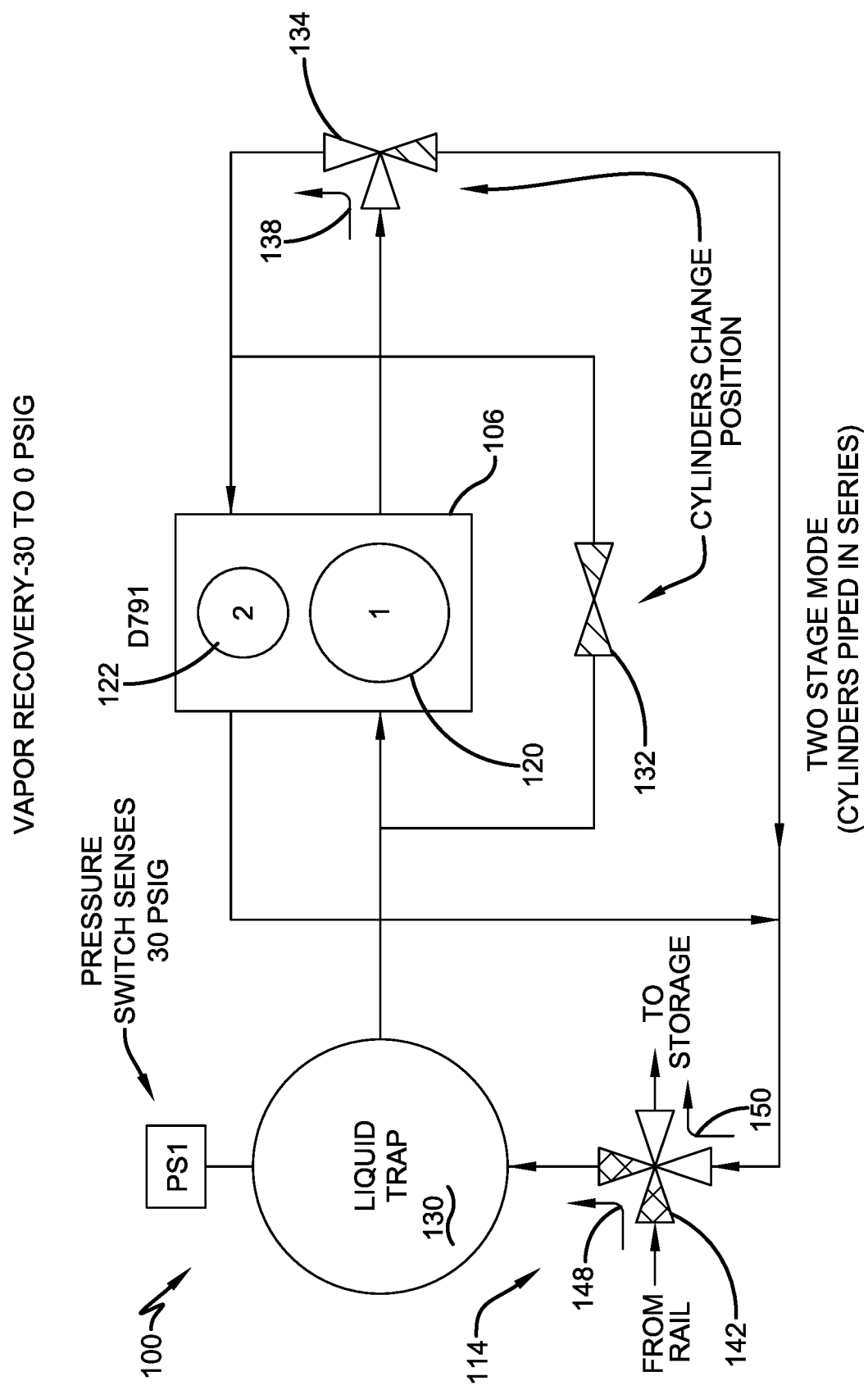
FIG. 10 is a schematic drawing illustrating an example implementation of a liquefied gas unloading and deep evacuation system during deep evacuation vapor recovery and in two stage mode where the cylinders are piped in series.
Figure 11:
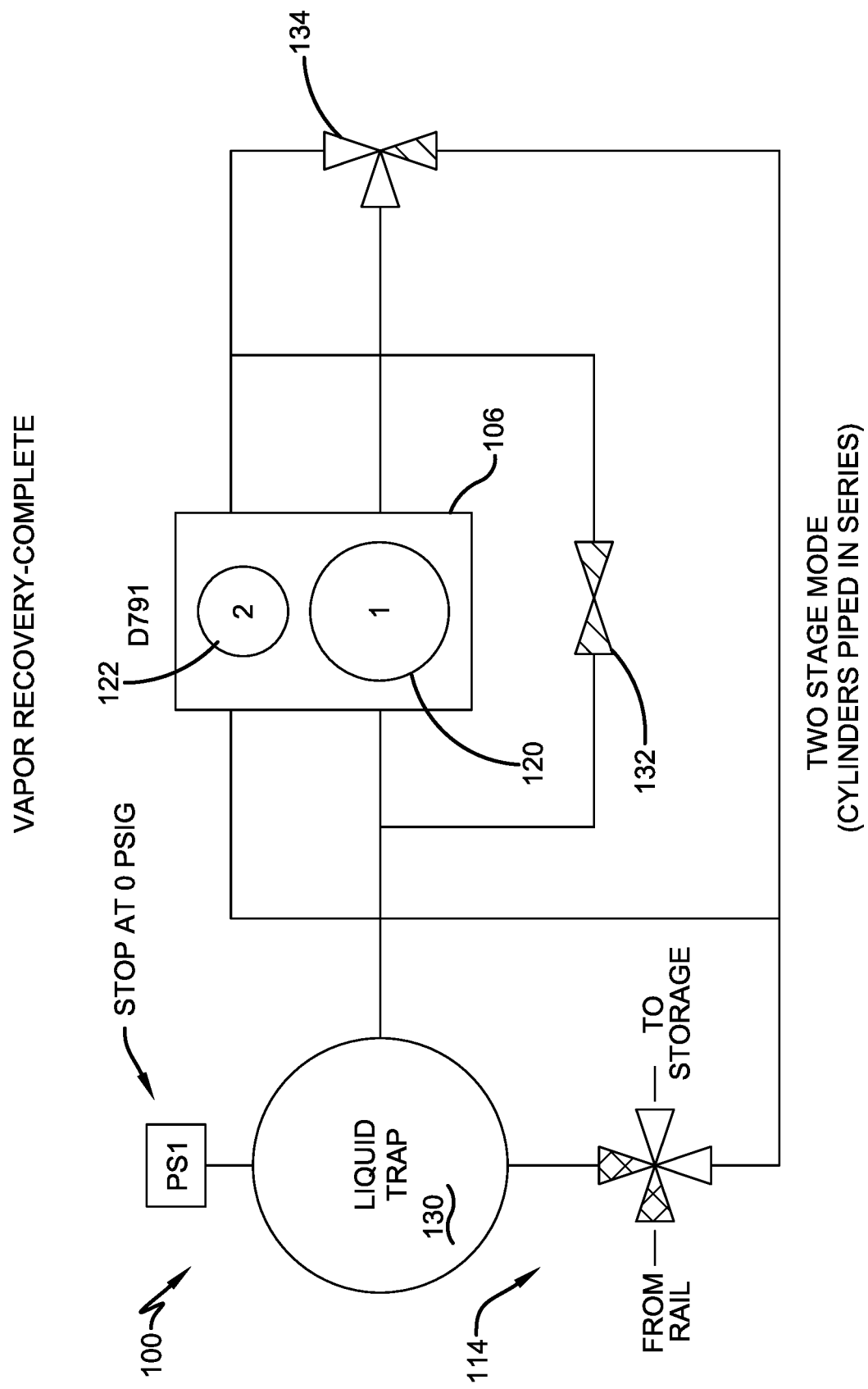
FIG. 11 is a schematic drawing illustrating an example implementation of a liquefied gas unloading and deep evacuation system at the completion of the deep evacuation vapor recovery phase at which point fluid flow has stopped.

When the supply tank 102 pressure (or system suction pressure) reaches the predetermined pressure to complete the initial vapor recovery stage, the two way valve 132 may be selectably changed to a closed position. In the closed position, the first cylinder 120 and the second cylinder 122 are piped in series through a three way valve 134. FIG. 9 is an example implementation of a pressure switch PS1 operably connected to the liquid trap 130 and sensing the predetermined pressure. As shown in FIG. 9, when the predetermine pressure is for example, about 30 psi, the pressure switch PS1 signals the system 100 to switch the process switch to the deep evacuation stage. FIGS. 10 and 11 show the two way valve in the closed position during the deep evacuation stage of the vapor recovery process.

The three way valve 134 is shown in FIGS. 3-11. The three way valve 134 may fluidly couple the two stage compressor 106 with the four way valve 114. The three way valve 134 may be selectably changeable between a first passageway 136 and a second passageway 138. The first passageway 136 may fluidly couple the first cylinder 120 with the four way valve 114. The second passageway 138 may fluidly couple the first cylinder 120 with the second cylinder 122 of the two stage compressor 106. The first passageway 136 of the three way valve 134 may be open during the single stage mode and may be closed during the second stage mode. The second passageway 138 of the three way valve 134 may be closed during the single stage mode and may be open during two stage mode.

Figure 4:
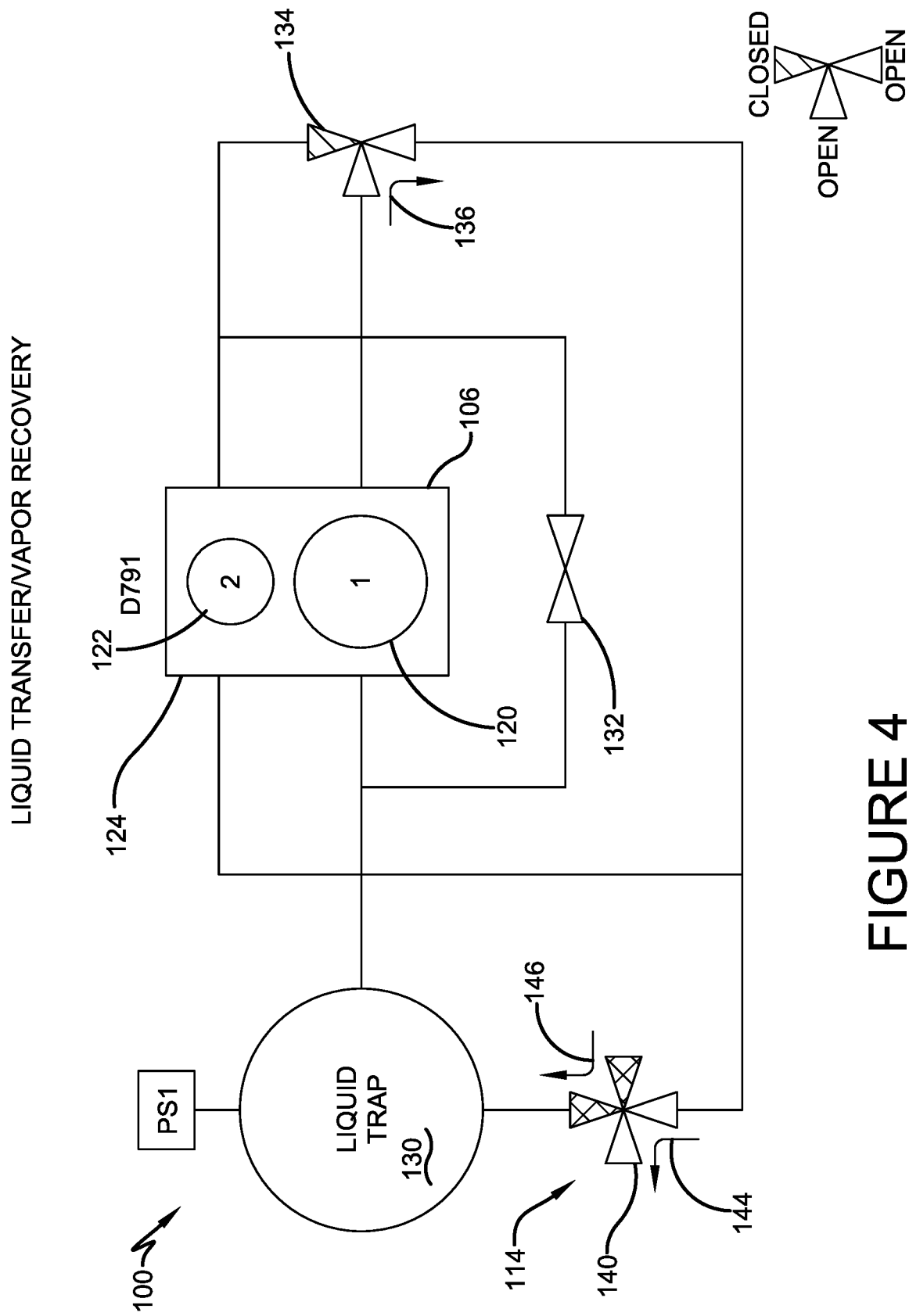
FIG. 4 is a schematic drawing illustrating an example implementation of a liquefied gas unloading and deep evacuation system.
Figure 4A:
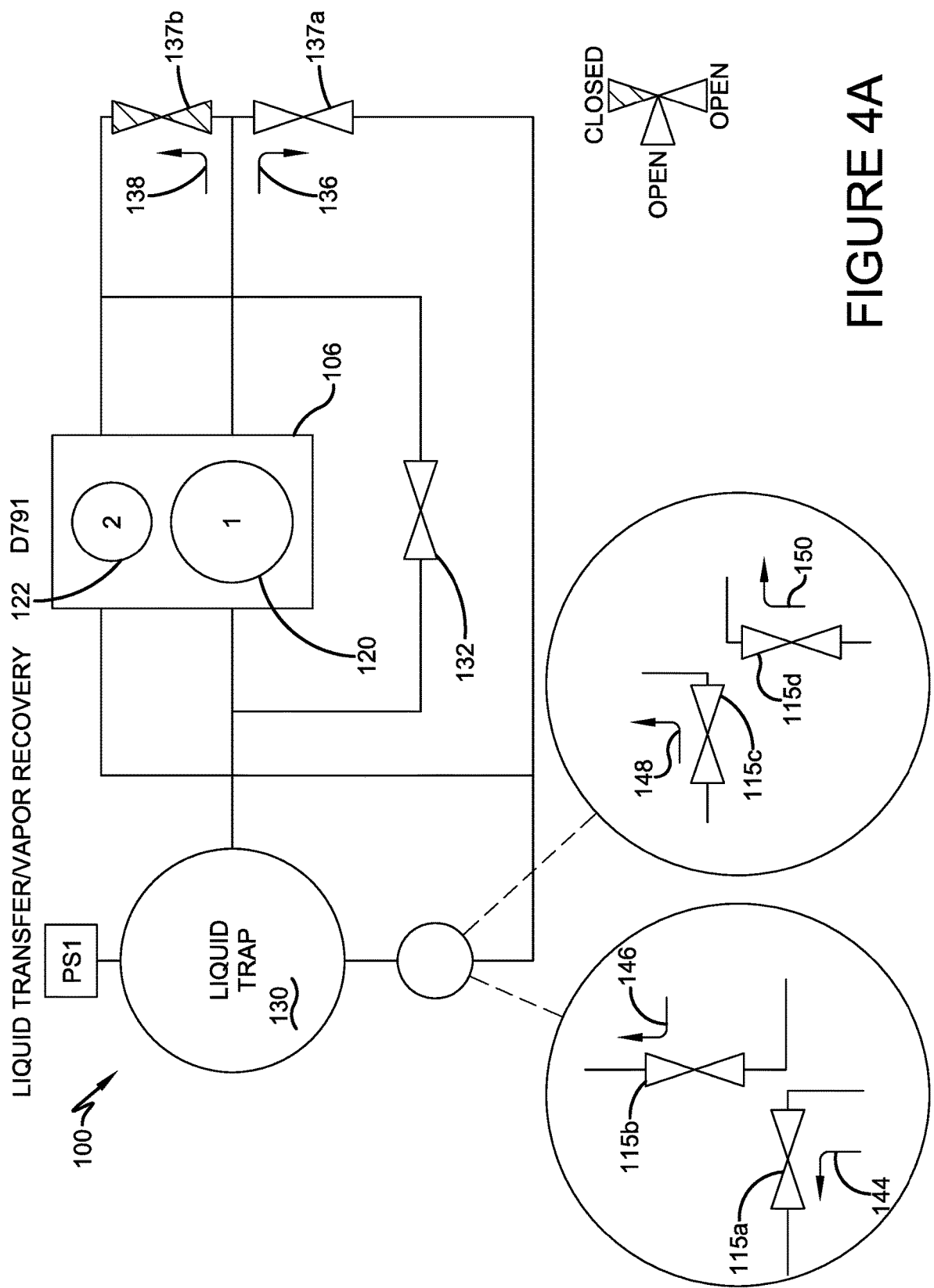
FIG. 4A is a schematic drawing illustrating an example implementation of a liquefied gas unloading and deep evacuation system.

In another implementation, the first passageway 136 and the second passageway 138 may be defined by two, two way valves 137a, 137b rather than the three way valve as shown in FIG. 4A.

The liquid transfer mode, the heel boil-off and vapor recovery stages are shown in FIGS. 4-11. During the liquid transfer mode and heel boil-off and initial vapor recovery stages, the first passageway way 136 may be open and the second passageway 138 may be closed. Vapor travels from the liquid trap 130, through the first cylinder 120 and the second cylinder 122 in parallel, and then passes through the first passageway 136 of the three way valve 134. After passing through the three way valve 136, the vapor, under increased pressure from passing through the first cylinder 120, then travels to the four way valve 114 and either returns to the supply tank 102 or the storage tank depending upon the position of the four way valve 114.

Turning to FIG. 9 an example implementation of a pressure switch PS1 operably connected to the liquid trap 130 and sensing the predetermined pressure. As shown in FIG. 9, when the predetermine pressure is for example, about 30 psi, the pressure switch PS1 signals the system 100 to switch the process to the deep evacuation stage. The first passageway 136 of the three way valve 134 closes and the second passageway 138 opens. FIGS. 10 and 11 show the passageway 136 in the closed position during the deep evacuation stage of the vapor recovery process. During the deep evacuation stage, vapor travels from the liquid trap 130, through the first cylinder 120, then the second passageway 138 of the three way valve 134, and then the second cylinder 122. During this stage, the first cylinder 120 and the second cylinder may be in series. Vapor under increased pressure exiting the second cylinder 122 then passes through the four way valve and returns to the storage tank 104.

The four way valve 114 is shown in FIGS. 1-11. The four way valve 114 may comprise a first position 140 and second position 142. The four way valve 114 may have two, L-shaped passageways, and when rotated to the first position 140 or the second position 142, four passageways coupling various components of the system may be defined as further described below. The first position 140 may comprise a first passageway 144 fluidly coupling the three way valve 134 and the second cylinder 122 with the supply tank 102. The first position 140 may also comprise a second passageway 146 fluidly coupling the storage tank 104 with the liquid trap 130 during liquid transfer. The second position 142 may comprise a third passageway 148 fluidly coupling the supply tank 102 with the liquid trap 130 and a fourth passageway 150 that may fluidly couple the three way valve 134 and the second cylinder 122 of the two stage compressor 106 with the storage tank 104 during vapor recovery. When the system 100 switches to the compressor 106 to the two stage mode, the four way valve remains in the second position 142 such that the third passageway 148 may fluidly couple the supply tank 102 with the liquid trap 130 and the fourth passageway 150 may fluidly couple the second cylinder 122 of the two stage compressor 106 with the storage tank 104.

FIG. 4A illustrates another implementation of the liquefied gas unloading and deep evacuation system 100, the four way valve 114 may be replaced with four, two way valves 115a, 115b, 115c, 115d. One two way valve 115a may comprise the first passageway 144 and the second two way valve 115b may comprise the second passageway 146. The third two way valve 115c may comprise the third passageway 148 and the fourth two way valve 115d may comprise the fourth passageway 150. It should be understood that any combination of valves may be utilized to achieve the four passageways fluidly coupling the components of the system 100. This may include the use of a three way valve and a two way valve or multiple two way valves as previously described.

With references to FIGS. 1-12, an example of the liquefied gas unloading and deep evacuation system 100 is shown and described in more detail. The supply tank 102, when in the form of a rail car, may have a dip tube 152 and other piping for liquid transfer and vapor recovery. To fully evacuate vapor and transfer as much liquid as possible, the process goes through a liquid transfer mode and a vapor recovery mode. The vapor recovery mode may comprise a liquid heel boil-off stage, a vapor recovery stage and a deep vapor evacuation stage.

Figure 5:
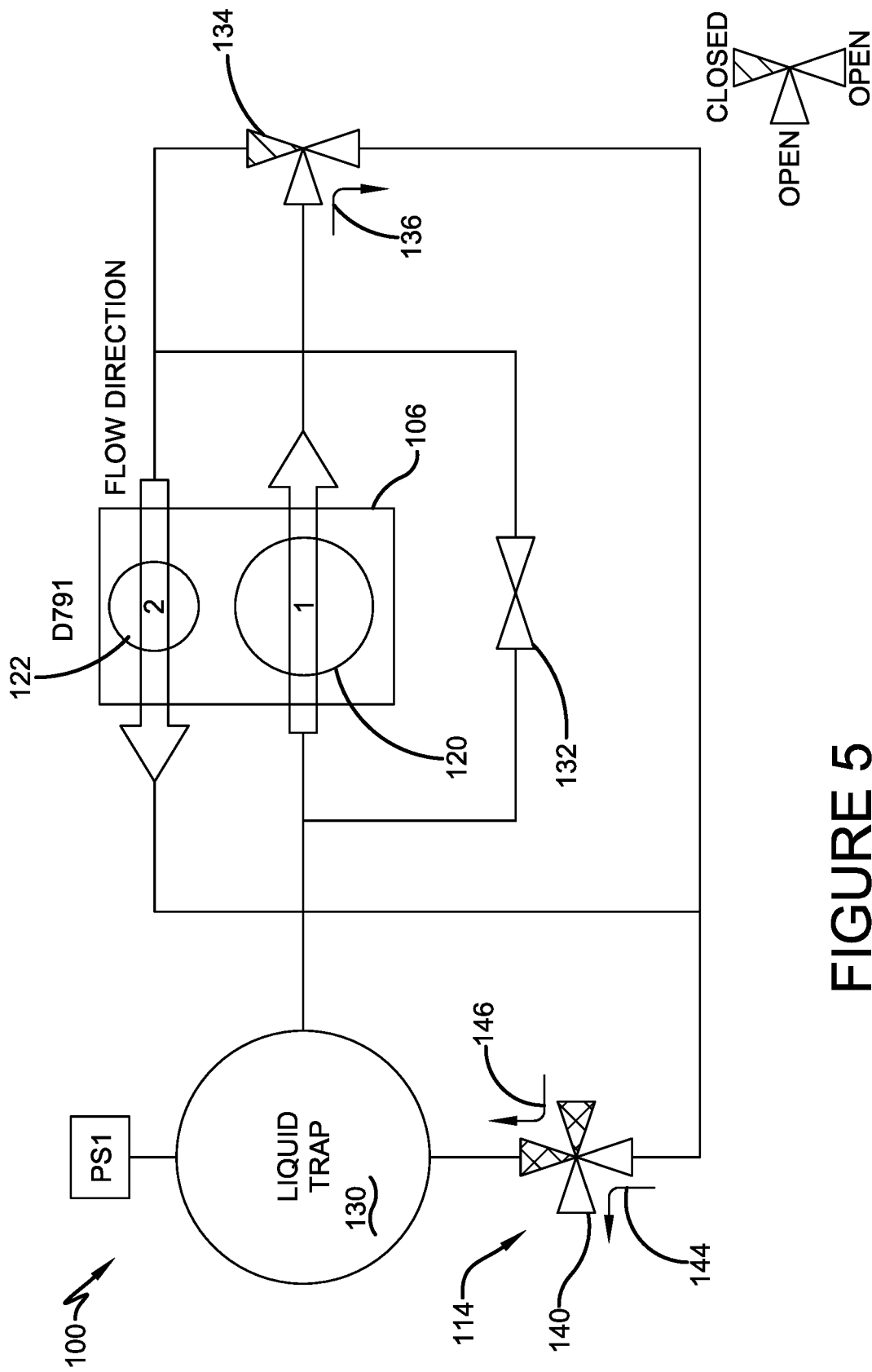
FIG. 5 is a schematic drawing illustrating the direction of fluid flow in an example implementation of a liquefied gas unloading and deep evacuation system.
Figure 6:
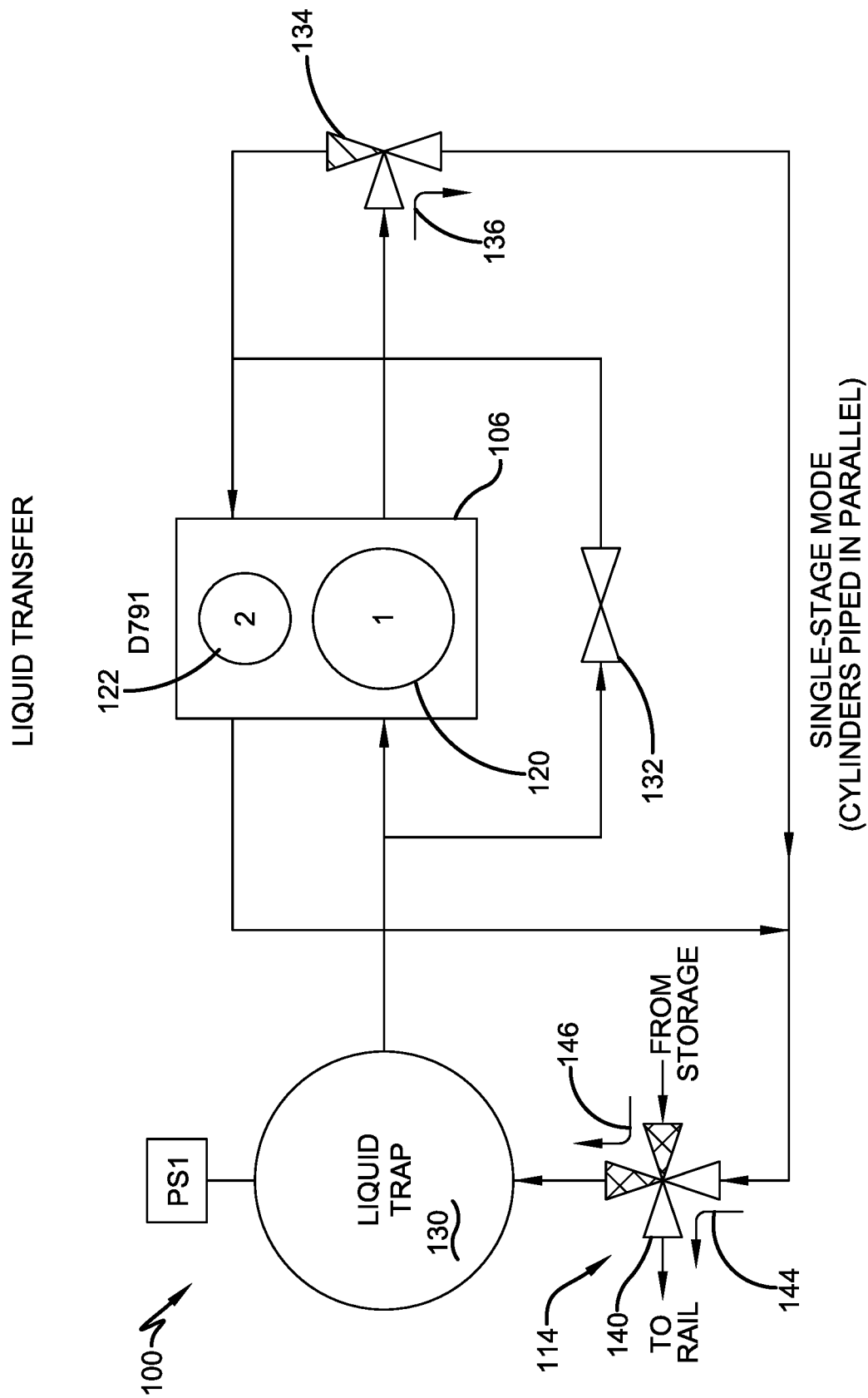
FIG. 6 is a schematic drawing illustrating an example implementation of a liquefied gas unloading and deep evacuation system in single stage mode with the cylinders piped in parallel during the liquid transfer phase.

FIGS. 5 and 6 show an example implementation of the liquid transfer mode, which may also include an initial vapor recovery mode. As previously described, when the two stage compressor 106 is started and it pulls vapor from the top 108 of the storage tank 104 through transfer piping 110. The two stage compressor 106 compresses vapor and increases the vapor pressure as it is pushed into the top 116 of the supply tank 102. As differential pressure between the supply tank 102 and the storage tank 104 increases, liquid begins to flow from the supply tank 102 to the storage tank 104 through transfer piping 120. In this liquid transfer mode, suction pulls vapor from the storage tank 104, through the second passageway 146 of the four way valve 114 and enters liquid trap 130. The vapor may then enter the compressor 106. The two way valve 132 is open and the three way valve 134 is positioned such that vapor from the liquid trap passes through the first cylinder 120 and the second cylinder 122 in parallel. This is accomplished through the two way valve 132 being open and the first passageway 136 of the three way valve being open to the four way valve 114. Pressurized vapor exiting the second cylinder 122 may combine with pressurized vapor exiting the first cylinder 120 after passing through the first passageway 136 of the three way valve, and pass through the first passageway 144 of the four way valve 114 and enters the supply tank 102. As pressure increase inside the supply tank 102, the liquid is forced into the storage tank 104 through piping 110.

Figure 7:
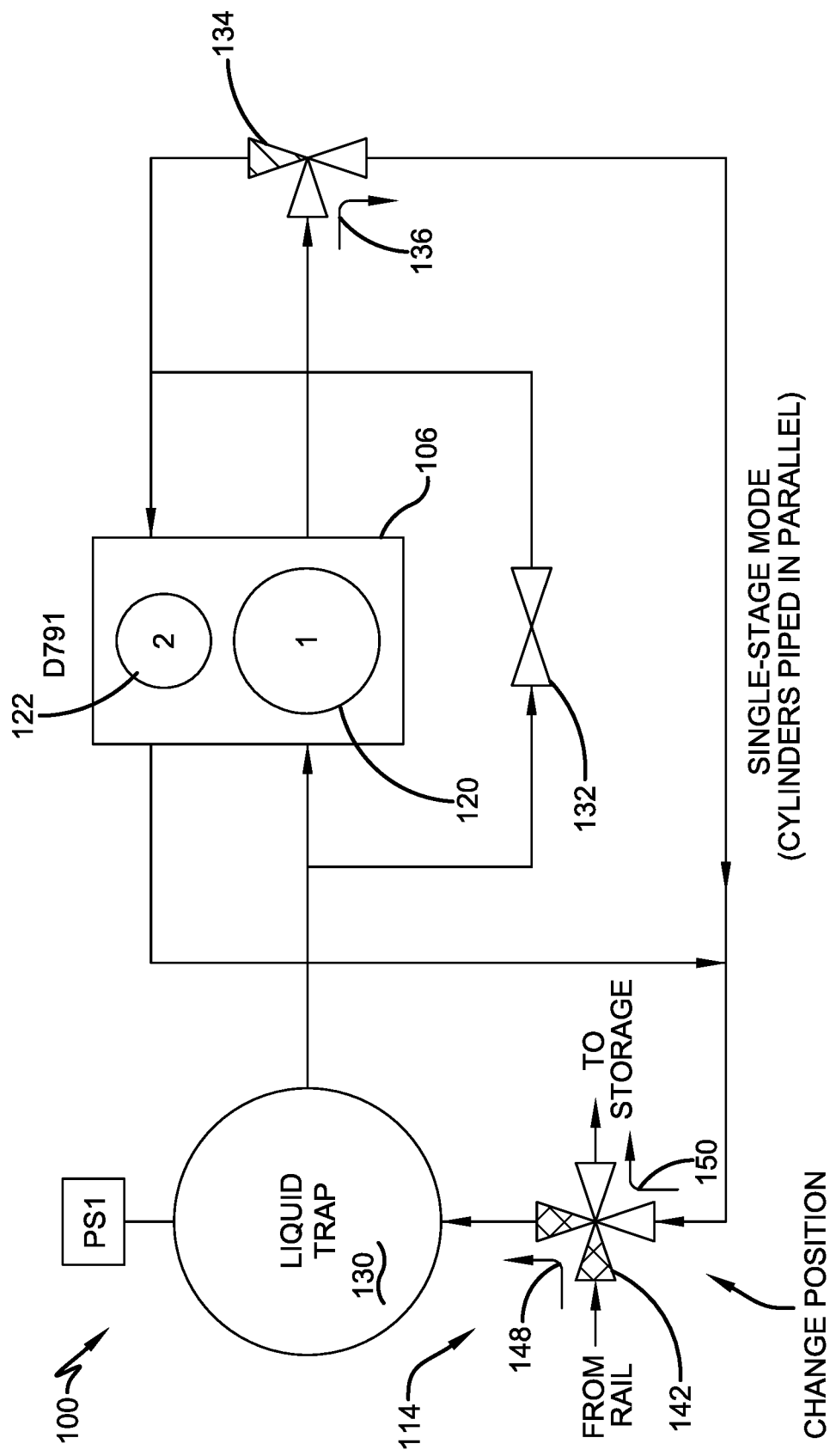
FIG. 7 is a schematic drawing illustrating an example implementation of a liquefied gas unloading and deep evacuation system in single stage mode at the beginning of the heel boil-off and vapor recovery phase.

With reference to FIG. 7, the vapor recovery mode is shown, and one example of the heel boil-off stage and the vapor recovery stage. Valve positions may change. As shown in FIG. 7, the two way valve 132 remains open as does the first passageway 136 of the three way valve 134. The compressor 106 may maintain the single stage mode with the first cylinder 120 and the second cylinder 122 being piped in parallel. During this stage the four way valve 114 changes to the second position 142. In one example implementation, movement from the first position 140 to the second position 142 of the four way valve 114 may be a ninety degree turn of a handle of the four way valve. In the second position 142 of the four way valve 114, suction moves vapor from the supply tank 102 through the third passageway 148 to the liquid trap 130. Vapor passes through the liquid trap 130 and enters the compressor 106. The vapor passes through the compressor 106 as described. During the heel boil-off stage and the vapor recovery stage, pressurized vapor exiting the second cylinder 122 and the first passageway 136 of the three way valve 134, the pressurized vapor travels through the fourth passageway 150 of the four way valve 114 and enters the storage tank 104. This vapor recovery stage continues until the pressure switch PS1 detects a predetermined pressure.

Figure 8:
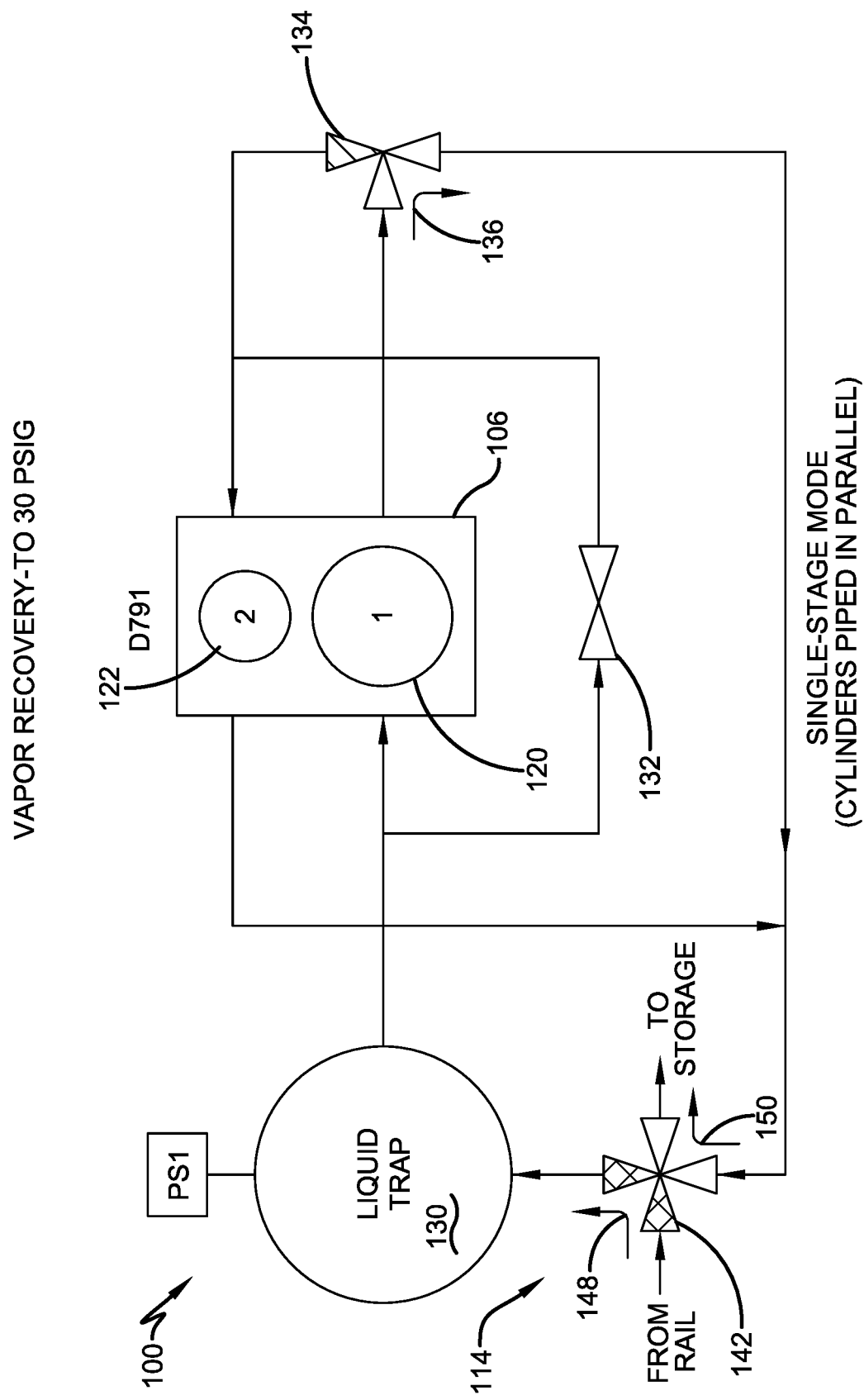
FIG. 8 is a schematic drawing illustrating an example implementation of a liquefied gas unloading and deep evacuation system in single stage mode during the vapor recovery phase.

In one nonlimiting example, the predetermined pressure may occur at 50 psi before the system enters the deep evacuation stage. In another implementation, the predetermined pressure may be 40 psi before entering the deep evacuation stage. In yet another implementation, and as illustrated in FIG. 8, the vapor recovery stage may not occur until the pressure switch PS1 detects a pressure of 30 psi or even 20 psi.

With reference to FIG. 9, the pressure switch PS1 may detect a predetermined pressure, such as 30 psi. At such time, valve positions may again change as shown in FIGS. 10 and 11. Once the predetermined pressure is reached, the deep evacuation stage may begin until the pressure switch PS1 detects a pressure of about 0 psi in the supply tank 102. In the deep evacuation stage, the compressor 106 enters two stage mode. The two way valve 132 changes to the closed position. The first passageway 136 of the three way valve 134 closes, and the second passageway 138 of the three way valve 134 opens to fluidly couple the first cylinder 120 with the second cylinder 122 of the compressor 106. The four way valve 114 maintains the second position 142, which may comprise the third passageway 148 and the fourth passageway 150 as previously described. During the deep evacuation stage, the vapor may be suctioned out. The vapor travels through the third passageway 148 of the four way valve 114 into the liquid trap 130. The vapor leaves the liquid trap and enters the first cylinder 120 where it is compressed. The higher pressurized vapor discharged from the first cylinder 120 travels through the second passageway 138 of the three way valve 134 and enters the second cylinder 122 of the compressor. The vapor is further compressed and discharged from the compressor 106. The compressed vapor enters the fourth passageway 150 of the four way valve 114 and goes to the storage tank 104. The deep evacuation process may be considered completed when the supply tank reaches about 0 psi or close to 0 psi, which may be any pressure less than 10 psi. At such time, the electric motor 128 is turned off and the deep evacuation stage is completed.

Figure 12:
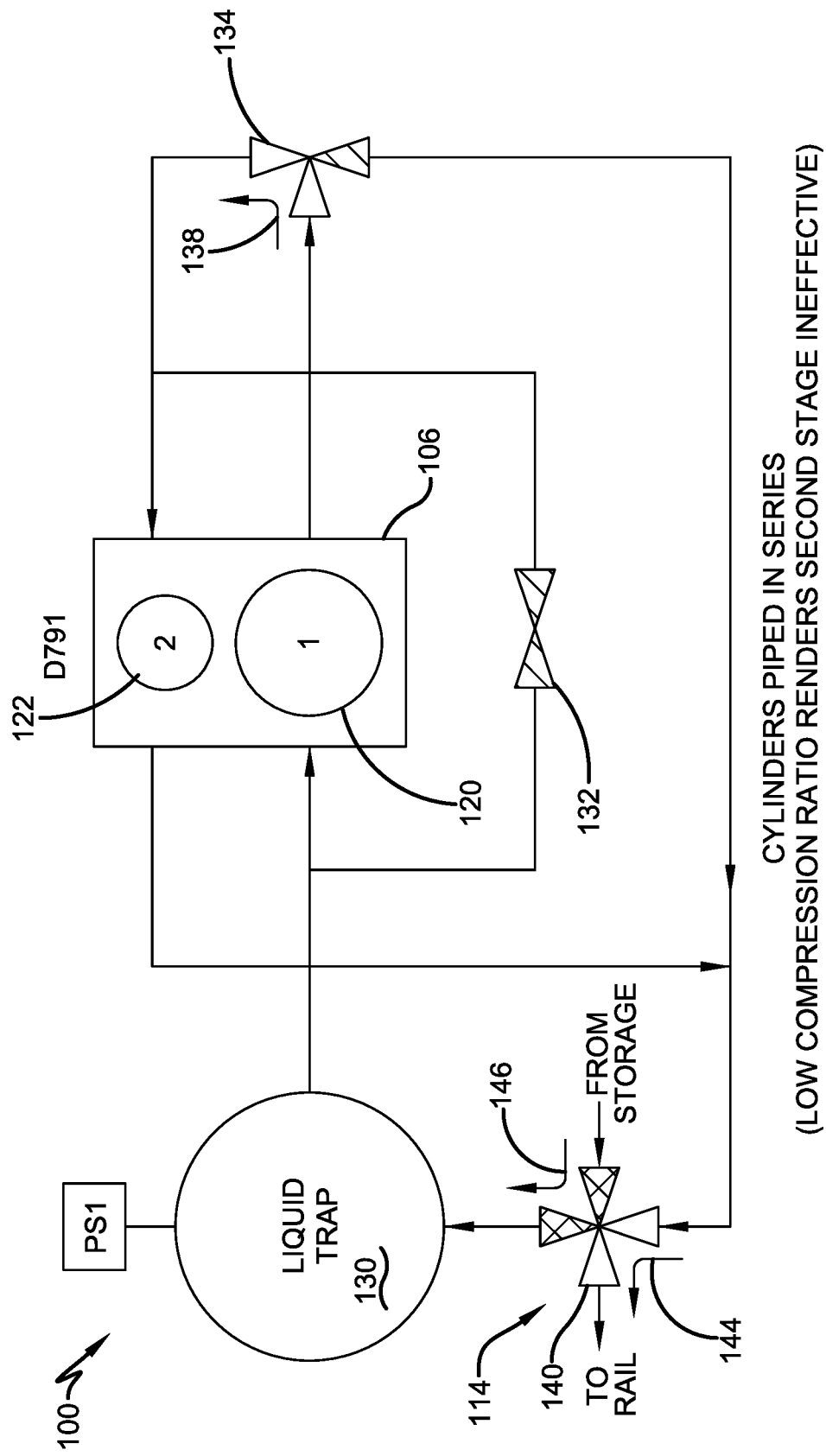
FIG. 12 is a schematic drawing illustrating an example implementation of a liquefied gas unloading and deep evacuation system used on a single rail car with a low maximum transfer rate.

The aforementioned liquid transfer and deep evacuation system described above may be utilized with two or more supply tanks 102. Each supply tank 102, such as a rail car, may have one or two excess flow valves 152 that may not exceed 150 gallons/minute, or 300 gallons/minute per rail car. With two supply tanks 102, liquid transfer of 600 gallons/minute may be achieved. In some implementations, the supply tank 102 may be a single rail car. In an example implementation utilizing only one supply tank, the compressor 106 may operate in two stage mode for slower liquid transfer, as shown in FIG. 12. This implementation may require a slower compressor speed to remain at or slightly below 300 gallons/minute depending on ambient temperature. The compressor 106 may operate at about 400-825 RPM (depending on the ambient temperature) and provide about a 300 gallons/minute liquid transfer rate year-round for unloading a single rail car.

With references to FIGS. 13-17, in another implementation of the liquefied gas unloading and deep evacuation system 100, the two stage compressor 106 may comprise variable speed. The system 100 may use a variable frequency drive (VFD) 154 to adjust and maximize the speed (and therefore the capacity) of the compressor 106 during the liquid transfer phase, vapor recovery, and the deep evacuation phase. In one implementation, the speed may vary due to ambient temperature as further explained below.

The system 100 may use the variable frequency drive (VFD) 154 to adjust and maximize the speed (and therefore the capacity) of the compressor 106 within the limits of the compressor's power rating and within the liquid flow limit as determined by the excess flow valves 118 operably connected to the supply tank(s) 102 being emptied. Supply tanks 102 and storage tanks 104 used may be fitted with excess flow valves 118, which allow a maximum flow rate at which liquid can be removed from a tank. If the maximum flow rate is exceeded, the excess flow valve 118 closes, which stops or slows the liquid transfer process. For example, a typical propane supply tank 102, such as a rail car, may be fitted with two excess flow valves 118, each rated for 150 gallons per minute (GPM) for a total maximum liquid withdraw rate of 300 GPM. The compressor 106 unloading two such supply tanks 102, such as rail cars, simultaneously should not exceed a total liquid transfer rate of 600 GPM. The vapor pressure of the liquid, such as propane, is higher in the summer than in the winter (as experienced in the northern and western hemispheres, for example). Using a fixed compressor speed, this results in a significantly higher liquid transfer rate in the summer than in the winter. For example, a fixed speed compressor should be selected to not exceed a transfer rate of 600 GPM in the summer. This fixed speed may result in a transfer rate below 400 GPM in the winter due to the lower vapor pressure of the liquid, such as propane. The liquefied gas unloading and deep evacuation system 100 can vary the compressor speed (run faster in the winter) to maximize the liquid transfer rate in all seasons. The maximum benefit will be reduced unloading times during the winter months, which may coincide with the busiest time of year in the propane industry.

The new system 100 can also vary the compressor speed during the vapor recovery process. At the beginning of the evacuation process, the power required by the compressor 106 may be relatively low due to the low compression ratio. Toward the end of the evacuation process, the power required by the compressor is also relatively low due to the lower mass flow rate. However, in the middle of the evacuation process a power peak occurs. In a fixed speed compressor, the compressor speed must be selected to not exceed the peak power rating of the compressor or motor. The new system 100 can vary the compressor speed to operate at higher speeds at the beginning and end of the evacuation process, and slower in the middle to avoid exceeding the power rating of the compressor or motor. The effect of this is to reduce the time required for the evacuation process.

Figure 13:
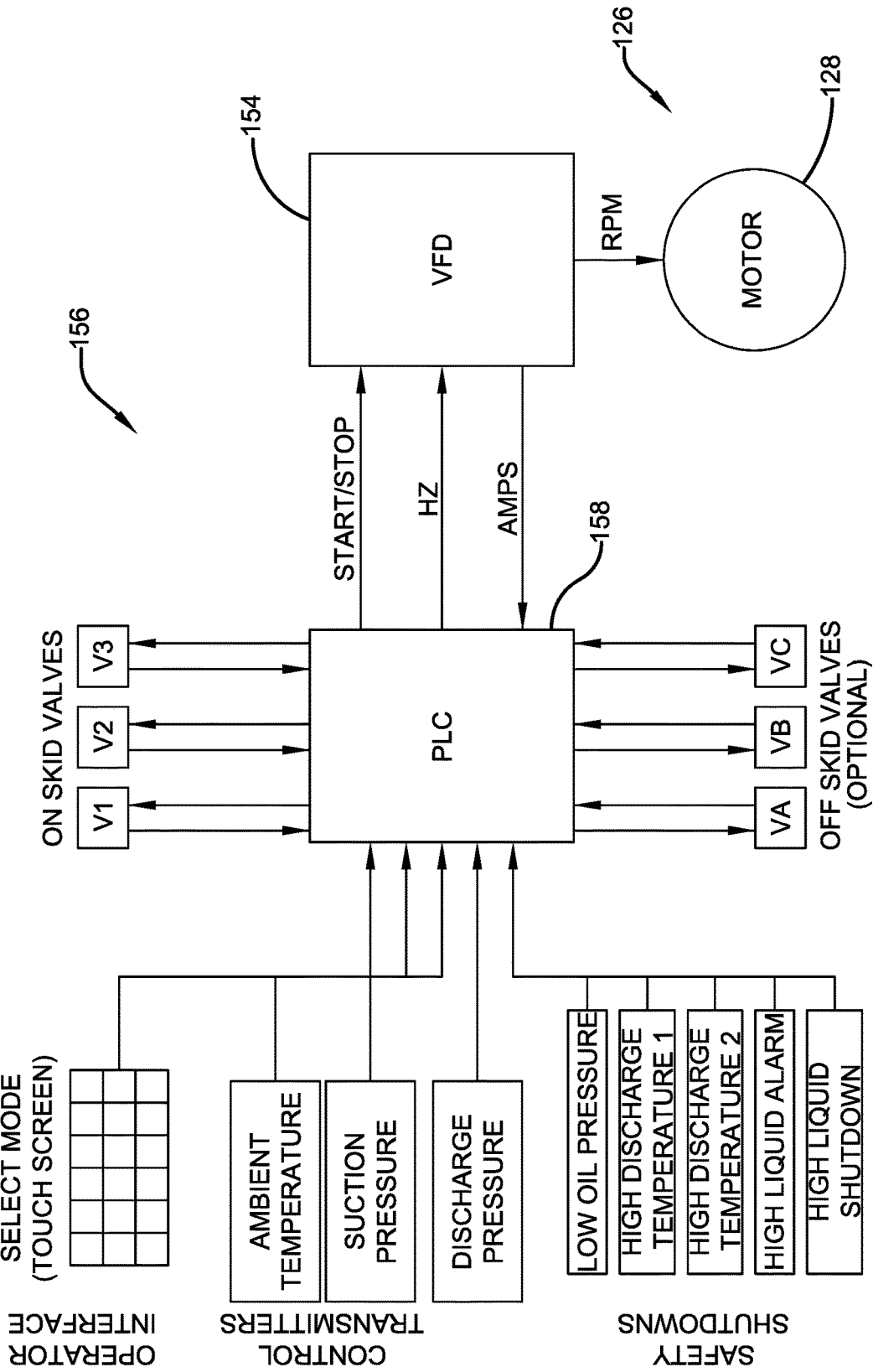
FIG. 13 is an example of a control system diagram showing how the PLC communicates with the components of the liquefied gas unloading and deep evacuation system.
Figure 14:
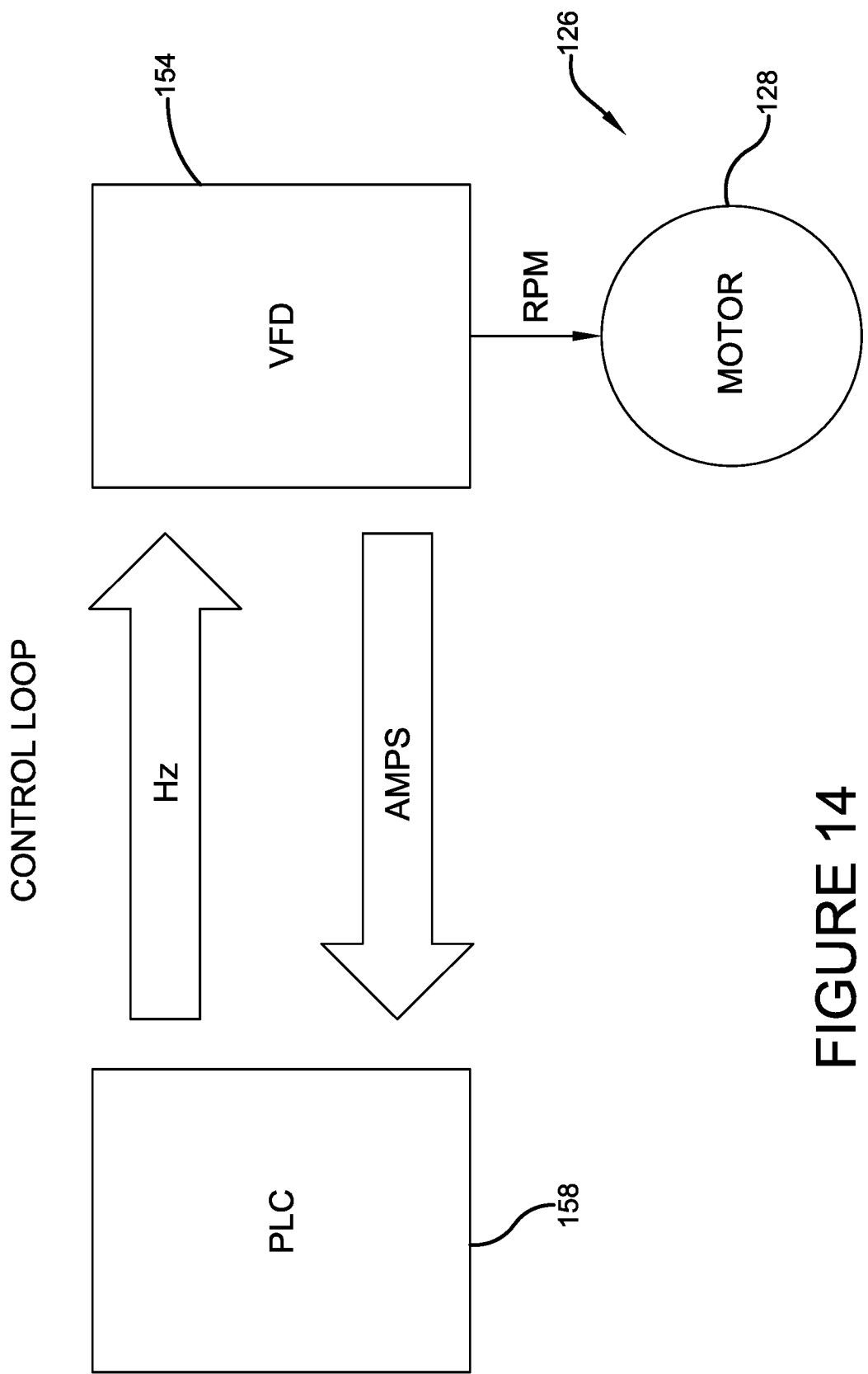
FIG. 14 is a block diagram showing an example of a control loop between the PLC, the variable frequency drive, and the compressor motor.

With reference to FIGS. 13 and 14, a control system 156 is shown. A programmable logic controller (PLC) 158 enables an operator to monitor operating conditions and environmental conditions to optimize the operation of the compressor 106. Environmental and operating conditions are sent to the PLC. The environmental conditions may include without limitation, ambient temperature. Operating conditions may include without limitation, an operator interface, suction pressure, discharge pressure, low oil pressure, high discharge temperatures, a high liquid alarm and/or a high liquid shutdown. In one implementation, control transmitters may be used to transmit data relating to ambient temperature, suction pressure and discharge pressure. In another implementation, the control system 156 may utilize signals from transmitters to detect suction pressure, discharge pressure, low oil pressure, high discharge temperatures, high liquid alarm and high liquid shutdown as parameters for safety shutdowns. As shown in FIG. 14, a control loop may be defined by the PLC 158, the VFD 154, and the motor 128. The PLC 158 may provide a frequency signal (Hz) to the VFD 154. The frequency signal to the VFD 154 may correlate to a motor speed in revolutions per minute. The VFD 154 may provide feedback data in the form of motor amperage information. Depending upon the feedback motor amperage information, the PLC 158 may then adjust the frequency signal to maintain a maximum motor amperage. This includes the optimum compressor speed (capacity) for the environmental conditions. The system 100 may transfer liquid faster, evacuate the tank faster, and recover more product from each tank.

Figure 15:
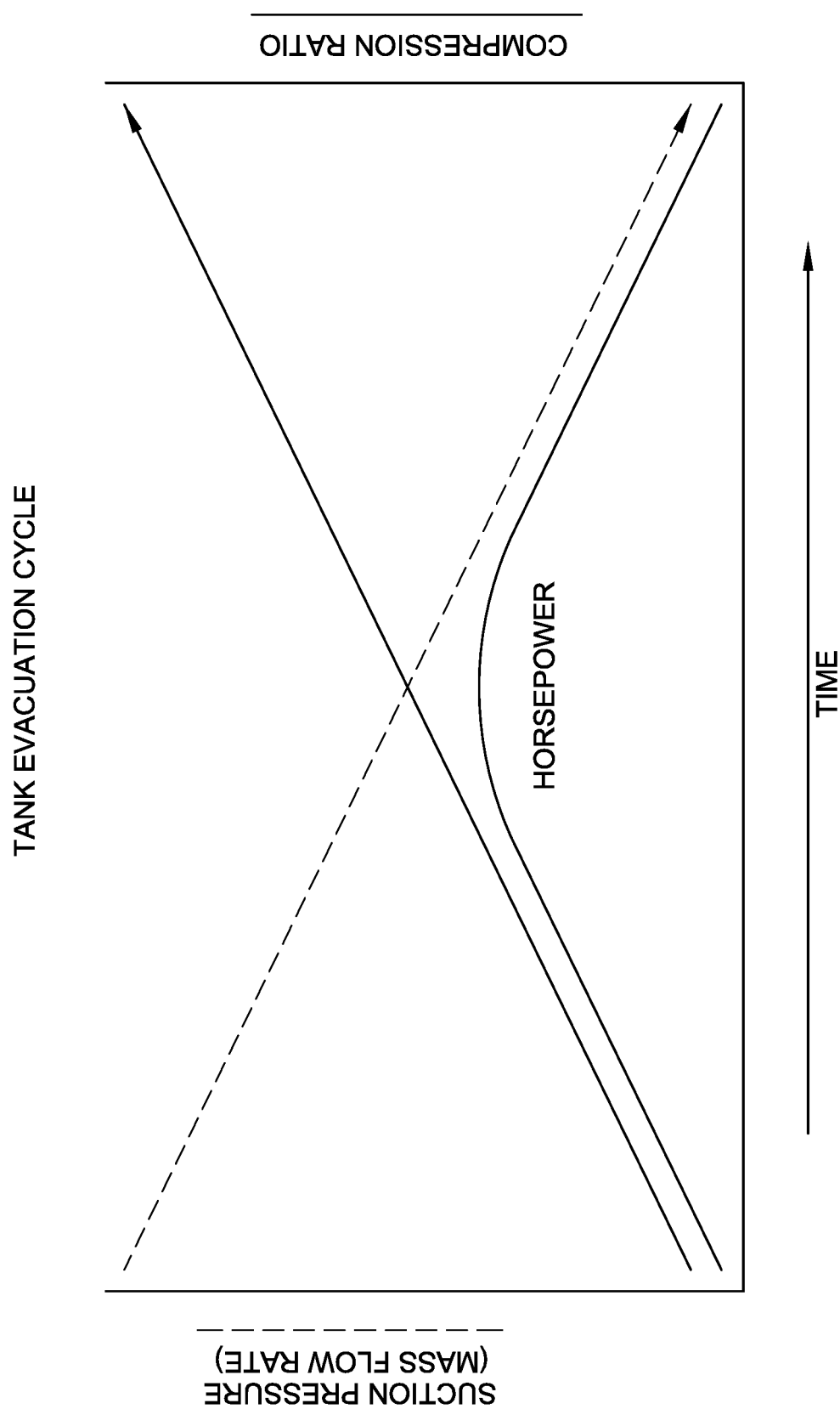
FIG. 15 is a graph showing an example of the relationship between the fluid flow rate, the compression ratio, and the motor horsepower.
Figure 16:
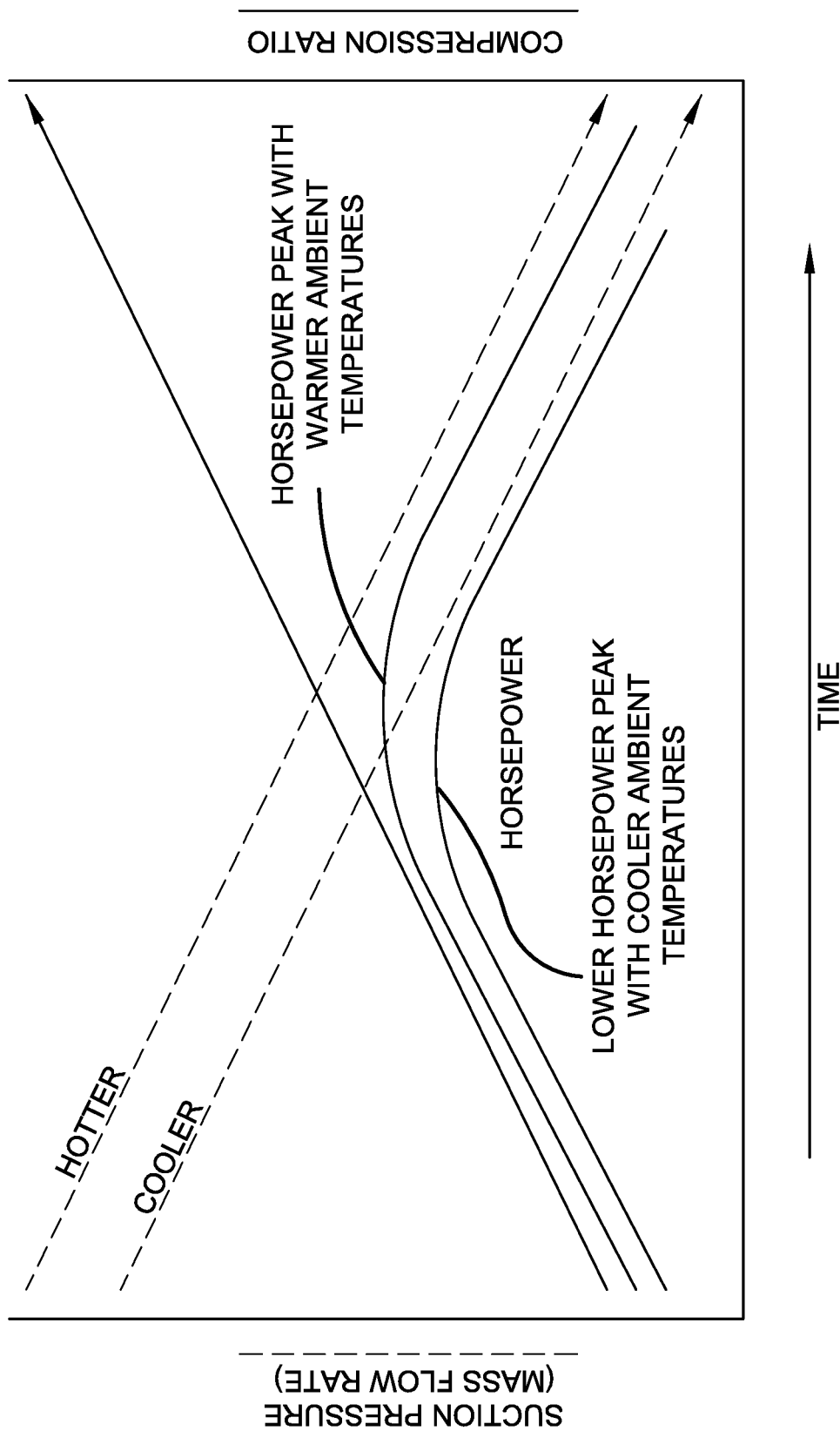
FIG. 16 is a graph showing an example of the differences in fluid flow rate at hotter and cooler temperatures and how that affects the motor horsepower over time.
Figure 17:
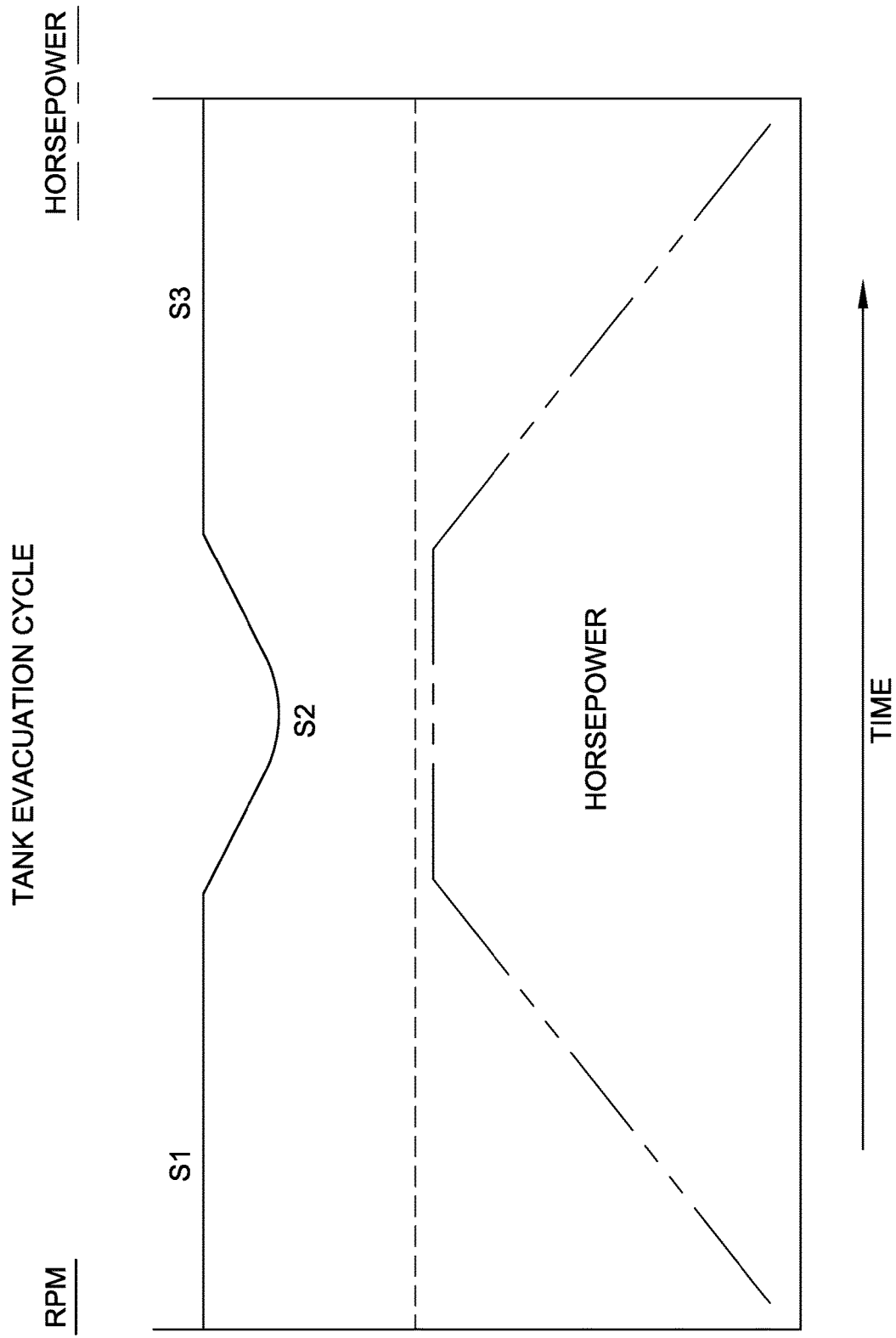
FIG. 17 is a graph showing an example of controlling peak power required by reducing the compressor speed.

FIGS. 15-17 illustrate nonlimiting implementations of utilizing the VFD. Turning to FIG. 15, suction pressure (mass flow rate) is shown to be inversely proportional to the compression ratio over time. At the beginning of the heel boil-off/vapor recovery stage, the mass flow rate is high, there is a low compression ratio, and the system uses low horsepower. During the middle of the cycle during the vapor recovery stage, both the mass flow rate and the compression ratio is medium, but the system experiences high horsepower. During the deep evacuation stage, there is a high compression ratio, a low flow rate and low horsepower. As shown in FIG. 15, horsepower peaks during mid-cycle. Turning to FIG. 16, the same pattern is shown with the addition of showing warmer and cooler ambient temperature. In cooler weather, vapor pressure (suction pressure) is lower. In cooler temperatures, there is a lower horsepower peak. To ensure that the horsepower does not exceed the limit of the compressor, and simultaneously, and to compensate for the horsepower peak during mid-cycle, the liquefied gas unloading and deep evacuation system 100 lowers the speed of the compressor only when necessary to keep the horsepower within the limits of the compressor. By utilizing the control system 156 with the control loop between the PLC 158 and the VFD 154, the electric motor 128, and thus the speed of the compressor 106, adjusts during mid-cycle so that compressor speed is always operating at the highest rpm possible during the various stages without exceeding the horsepower limit. In one implementation the liquid heel boil-off stage may comprise a speed S1, the second vapor recovery stage may comprise a speed S2, and the deep vapor evacuation stage may comprise a speed S3, wherein S2 is less than S1 and S3 as shown in FIG. 17. This variable speed drive technique can be applied to either two-stage compressors or a traditional single-stage compressor with identical benefits.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A liquefied gas unloading and deep evacuation system, comprising: a variable speed two stage compressor comprising a single stage mode and a two stage mode; the two stage compressor comprising a first cylinder and a second cylinder; a liquid trap fluidly coupled with the variable speed two stage compressor; a pressure switch operably connected to a discharge of the compressor and configured to sense a differential pressure; a control system, comprising a control loop defined by a programmable logic controller, a variable frequency drive, and a motor; the programmable logic controller operably communicable with the two-stage compressor, the programmable logic controller configured to operably control the variable speed of the two-stage compressor and operably transitioning the two stage compressor between the single stage mode and the two stage mode at a predetermined differential pressure based on operating conditions; the variable frequency drive operably communicable with the programmable logic controller configured to provide feedback data to the programmable logic controller so the programmable logic controller can operably control the variable speed of the two-stage compressor; a three way valve fluidly coupling the two stage compressor with a four way valve, the three way valve selectably changeable between a first passageway and a second passageway, the first passageway fluidly coupling the first cylinder with the four way valve, and the second passageway fluidly coupling the first cylinder with the second cylinder of the two stage compressor; the four way valve comprising a first position and second position the first position comprising a first passageway of the four way valve fluidly coupling the three way valve and the second cylinder with a supply tank and a second passageway fluidly coupling a storage tank with the liquid trap during the single stage mode; the second position comprising a third passageway fluidly coupling the supply tank with the liquid trap and a fourth passageway fluidly coupling the three way valve and the second cylinder of the two stage compressor with the storage tank during the single stage mode; the second position comprising the third passageway fluidly coupling the supply tank with the liquid trap and the fourth passageway fluidly coupling the second cylinder of the two stage compressor with the storage tank during the two stage mode; further comprising a liquid heel boil-off/vapor recovery stage comprising a compressor speed S1, a second vapor recovery stage comprising a compressor speed S2, and the deep vapor evacuation stage comprising a compressor speed S3, wherein the compressor speed at S2 is less than the compressor speed at both S1 and S3; the deep vapor evacuation stage being completed when a supply tank reaches a pressure less than 10 psi; the deep vapor evacuation stage being in the two stage mode.

2. The liquefied gas unloading and deep evacuation system of claim 1, wherein the predetermined pressure is about 50 psi.

3. The liquefied gas unloading and deep evacuation system of claim 1, wherein the predetermine pressure is about 30 psi.

4. The liquefied gas unloading and deep evacuation system of claim 1, wherein the supply tank is a rail car.

5. The liquefied gas unloading and deep evacuation system of claim 1, comprising a two way valve selectably and fluidly coupling the liquid trap with the two stage compressor, the two way valve being open during the single stage mode and closed during the two stage mode.

6. The liquefied gas unloading and deep evacuation system of claim 5, wherein the two way valve is fluidly coupled with the second cylinder of the two stage compressor.

7. The liquefied gas unloading and deep evacuation system of claim 1, wherein the first passageway of the three way valve is open during the single stage mode and closed during the second stage mode, and the second passageway of the three way valve is closed during the single stage mode and open during second stage mode.

8. The liquefied gas unloading and deep evacuation system of claim 1, wherein the first cylinder and the second cylinder are in parallel in the single stage mode, the first cylinder and the second cylinder are in series in the two stage mode.

9. The liquefied gas unloading and deep evacuation system of claim 1, the two stage compressor comprising a first speed and a second speed, the first speed being greater than the second speed.

10. The liquefied gas unloading and deep evacuation system of claim 1, further comprising a programmable logic controller operably controlling the variable speed of the two stage compressor.

11. The liquefied gas unloading and deep evacuation system of claim 10, the programmable logic controller operably controlling the variable speed of the two stage compressor from one or more of:
 ambient temperature;
 suction pressure;
 discharge pressure
 low oil pressure;
 high discharge temperature;
 high liquid alarm; and/or
 high liquid shutdown.

12. The liquefied gas unloading and deep evacuation system of claim 1, wherein the liquefied gas is one or more of propane, propylene, and butane.

* * * * *